Patented Feb. 23, 1937

2,071,875

UNITED STATES PATENT OFFICE 2,071,875

COMPOSITION OF MATTER

Max Engelmann, Wilmington, Del., assignor to E. I. du Pont de Nemours & Company, Wilmington, Del., a corporation of Delaware No Drawing. Application November 11, 1933, Serial No. 697,694

8 Claims. (Cl. 167—65)

This invention relates to the arts of disinfection and sterilization and more particularly to the production of sterile and/or aseptic conditions. It especially appertains to compositions of matter suitable for use as disinfectants, germicides, antiseptics and sterilizers in the medical and technical arts.

Since the work of Lister in 1865 the art of disinfection has made rapid strides so that today germicidal substances are known in many portions of the field of chemistry. This will be obvious from the fact that copper-sulfate (especially useful against algae), sodium-oleate (useful in retarding the development of pneumococci and Streptococci of the hemolytic and S. viridans variety), glycerin (particularly useful for killing non-spore bearing bacteria), and bile salts (which restrain the growth of Staphylococci and Streptococci) are recognized for the action indicated.

The best disinfectant is, of course, one which possesses a high germicidal power, one which is not rendered ineffective by the presence of organic matter, one that is reasonably stable, one that is harmless to man and the higher animals, one which does not corrode metal, one that has power of penetration, one that does not deteriorate fabrics and one that is reasonable in price. Briefly, the stress of modern activities demands disinfecting processes that are instantaneous in their action, all-pervading in their effects, cheap, harmless and free from unpleasant odors that might be offensive to the fastidious.

In a search for substances having the above mentioned characteristics, there has been discovered a new series of carbon compounds which have not only remarkable germicidal, disinfecting, antiseptic and sterilizing powers but which are also valuable fungicides. These substances are valuable both in the medical and technical arts.

According to this invention, it has been found that a new series of azo compounds having very valuable properties may be produced by diazotizing amino-tri-fluoro-methyl-benzenes and coupling the same with phenylene di-amines. The resulting compounds are azo dyes probably having the formula: R—N:N—R′, R and R′ standing for carbon compound radicals, residues, nuclei or groups. The simplest compound of this series is meta-tri-fluoro-methyl-phenyl-azo-meta-phenylene-diamine probably having the formula:

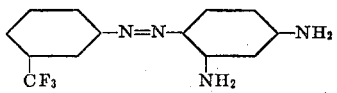

This invention had for an object the preparation of new compositions of matter having disinfecting, sterilizing, antiseptic and/or fungicidal action. Other objects were the preparation of such compositions in a very desirable physical and useful form and in a high state of purity. Still further objects were to produce compositions of matter comprising azo compounds, to produce compositions of matter comprising new derivatives of meta-amino-phenyl-fluoroform, to produce compositions of matter comprising new derivatives of meta-phenylene-diamine and to devise chemical, medical and technical processes. A general advance in the art and other objects which will appear hereinafter are also contemplated.

The foregoing objects and related ends are accomplished in the manner set out in the following description in which details of what is believed to be the best mode for carrying out the invention are disclosed. Specifically one method of accomplishing the afore-mentioned objects is to diazotize meta-amino-tri-fluoro-methyl-benzene (meta-amino-phenyl-fluoroform), couple the same with meta-phenylene-diamine, incorporate the same in a suitable solvent and bring the resultant composition into contact with the microorganism or related subject (bacteria, protozoa, germ, fungi and the like). The material may for example also be conveniently applied for germicidal and disinfectant purposes in the form of fine particles.

The invention will be further understood by a consideration of the following detailed description and illustrative specific examples in which the quantities are given in parts by weight.

PREPARATION OF THE AZO COMPOUNDS

Example I

In 2000 parts of water 197.5 parts of meta-amino-phenyl-fluoroform-hydrochloride were dissolved and 150 parts of concentrated hydrochloric acid (37–38% HCl) added. The resulting solution was cooled with ice to a temperature of about 5–6° C. and the amine diazotized with 69 parts of sodium nitrite in 400 parts of water. The diazo solution was then poured into a cooled solution of 108 parts of meta-phenylene-diamine in 250 parts of concentrated hydrochloric acid in 3000 parts of water. To the resulting solution, there was slowly added a saturated solution of sodium acetate until the strong Congo (C. I. 370) reaction of hydrochloric acid was changed to the weak reaction of acetic acid. In this particular instance about 800 parts of sodium acetate were required. There resulted a dark-red jelly-like mass which was brought to a temperature of about 40° C. and neutralized with a 10% solution of sodium hydrate. There was produced a product which separated in needle-like yellow crystals, probably having the formula:

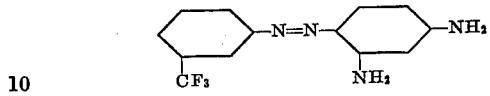

This product (meta-tri-fluoro-methyl-phenyl-azo-meta-phenylene-diamine) was filtered off, washed with water and dried. After recrystallization from ethyl alcohol it was found to melt at 122°–123° C. It is very soluble in organic solvents, for example, acetone, ethyl alcohol, benzene and ether. It is also soluble in strong organic acids for example, acetic acid and lactic acid. It dissolves readily in fatty oils for example, olive and palm oil and in mineral oils for example, petroleum distillation fractions. It is slightly soluble in water.

As will be clear from the mode of preparation and the above formula, this new azo compound has amino groups and therefore readily forms acid salts for example, the hydrobromide, the hydrochloride, the sulfate, the nitrate and the phosphate. In the form of the acid salts the compound is very soluble in water. The hydrochloric acid salt is also soluble in ethyl alcohol and acetone. It is insoluble in ethyl ether and benzene. It dyes cellulose acetate in brilliant yellow shades. Instead of coupling the azo compound components under acid conditions as above described, the reaction may be carried out in alkaline or practically neutral solutions for instance, in the presence of carbonates or bicarbonates for example those of the alkali metals, in the manner well understood by those skilled in the art.

*Example II*

A solution of diazotized meta-amino-phenyl-fluoroform was prepared as described in Example I and added to a cooled solution of 122 parts of meta-toluylene-diamine and 250 parts of 37% hydrochloric acid in 3000 parts of water. To the resulting solution there was added sodium acetate as described in Example I for the purpose of completing the coupling. The resulting red jelly-like mass was neutralized at about 40–45° C. with a diluted solution of sodium carbonate (sodium hydroxide solutions have also been used successfully) to precipitate the new azo compounds as a free base. This new compound meta-tri-fluoro-methyl-phenyl-azo-meta-toluylene-diamine probably has the formula:

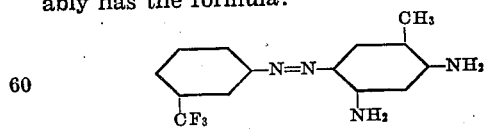

It melts at 137–138° C. It, like the product of Example I, is also very soluble in organic solvents including oils and imparts a yellow to orange color to gasoline and motor benzol. It is slightly soluble in water. As will be clear from the mode of preparation and the above formula, this compound has amino groups and it therefore readily forms acid salts for example, the hydrobromide, the hydrochloride, the sulfate, the nitrate and the phosphate. In the form of the acid salts it is very soluble in water. The hydrochloric acid salt is also soluble in ethyl alcohol and acetone. It is insoluble in ethyl ether and benzene. It dyes "acetate-silk" in yellow shades which tend toward orange. Instead of coupling the azo compound components under acid conditions as above described, the reaction may be carried out in alkaline or practically neutral solutions for instance, in the presence of alkali metal carbonates or bicarbonates in the manner well understood by those skilled in the art.

The meta-phenylene-diamine may have other alkyl substituents on the benzene ring. As illustrative of such compounds mention may be made of 1-ethyl-2:4-diamino-benzene, 1-propyl-2:4-diamino-benzene, 1-isopropyl-2:4-diamino-benzene, 1-butyl-2:4-diamino-benzene, 1-isobutyl-2:4-diamino-benzene, 1-secondary-butyl-2:4-diamino-benzene, 1-amyl-2:4-diamino-benzene, 1-isoamyl-2:4-diamino-benzene, 1-hexyl-2:4-diamino-benzene, 1-heptyl-2:4-diamino-benzene, 1-dodecyl-2:4-diamino-benzene, 1-hexadecyl-2:4-diamino-benzene, 1-octadecyl-2:4-diamino-benzene, 1-triacontyl-2:4-diamino-benzene, 1-methyl-3:5-diamino-benzene, 1-methyl-2:6-di-amino-benzene, 1:3-di-methyl-2:4-diamino-benzene, 1:4-di-methyl-3:5-diamino-benzene, 1:2-di-methyl-3:5-diamino-benzene and 1:2:4-tri-methyl-3:5-diamino-benzene.

*Example III*

A solution of diazotized meta-amino-tri-fluoro-methyl-benzene was prepared as described in Example I and added to a cooled solution of 138 parts of 2:4-diamino-anisole and 250 parts of concentrated hydrochloric acid in 5000 parts of water. Coupling and separation of the new azo body was carried out as described in Examples I and II. The resultant product was probably meta-tri-fluoro-methyl-phenyl-azo-2:4-diamino-anisole having the formula:

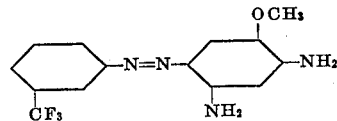

Upon recrystallization from ethyl alcohol, it was found to have a melting point of 141–142° C. It is slightly soluble in water but easily soluble in organic solvents. As will be clear from the mode of preparation and the above formula, the new azo compound has amino groups and it therefore readily forms acid salts for example, the hydrobromide, the hydrochloride, the sulfate, the nitrate and the phosphate. These acid salts are very soluble in water. The hydrochloric acid salt is also soluble in ethyl alcohol and acetone. It is insoluble in ethyl ether and benzene. It is a red colored product which dyes wool in orange shades. Cellulose esters and ethers are also dyed orange shades. Instead of coupling the azo compound components under acid conditions as above described, the reaction may be carried out in alkaline or practically neutral solutions for instance, in the presence of carbonates or bicarbonates in the manner well understood by those skilled in the art.

Related products are produced by coupling the diazotized meta-amino-phenyl-fluoroform with other alkoxy substituted meta-phenylene-diamines. As illustrative of such compounds mention may be made of 1-ethoxy-2:4-diamino-benzene, 1-propyloxy-2:4-diamino-benzene, 1-isopropyloxy-2:4-diamino-benzene, 1-butyloxy-2:4-diamino-benzene, 1-isobutyloxy-2:4-diamino-benzene, 1-secondary-butyloxy-2:4-diamino-benzene, 1-amyloxy-2:4-diamino-benzene, 1- isoamyloxy-2:4-diamino-benzene, 1-hexyloxy-2:4-diamino-benzene, 1-heptyloxy-2:4-diamino-benzene, 1-dodecyloxy-2:4-diamino-benzene, 1-hexadecyloxy-2:4-diamino-benzene, 1-octadecyloxy-2:4-diamino-benzene, 1-triacontyloxy-2:4-diamino-benzene, 1-methoxy-3:5-diamino-benzene, 1-methoxy-2:6-diamino-benzene, 1:3-di-methoxy-2:4-diamino-benzene, 1:4-di-methoxy-3:5-diamino-benzene, 1:2-di-methoxy-3:5-di-amino-benzene and 1:2:4-tri-methoxy-3:5-di-amino-benzene.

In some cases the ortho-diamines may replace the meta-diamines with satisfactory results. The fluoroform group (tri-fluoro-methyl) radical may in some cases be para or ortho to the amino group on the benzene ring if found desirable. The invention is not limited to the specific compounds set out in the above examples. Satisfactory results may be obtained with alkyl-alkoxy-meta-phenylene-diamines, for example, 1-methoxy-3-methyl-2:4-diamino-benzene, 1-methyl-3-methoxy-2:4-diamino-benzene, 1-methoxy-4:5-di-methyl-2:6-diamino-benzene, 1-methyl-3:5-di-methoxy-2:4-diamino-benzene.

Variations in coupling of the components to produce the new azo bodies will be obvious to those skilled in the art. The proportions and temperatures given in the specific examples are not critical. Variations within the scope of the invention will be obvious to those skilled in the art.

PREPARATION OF THE DISINFECTANT COMPOSITIONS

Example IV

Meta-tri-fluoro-methyl-phenyl-azo-meta-phenylene-diamine (the product of Example I above) was dissolved in alcohol and the resultant acidified with concentrated hydrochloric acid to a weak Congo reaction. The alcohol was then evaporated to isolate the hydrochloric acid salt of the amino body. This isolated substance which did not have a melting point was dissolved in water to produce a solution having a concentration of 1 to 3500 (.35%). With this solution a culture of *Staphylococcus aureus* was treated and it was found that the solution killed the microorganisms in question.

Example V

Meta-tri-fluoro-methyl-phenyl-azo-meta-phenylene-diamine was dissolved in alcohol and acidified with dry hydrogen chloride gas to produce a weak Congo reaction. Thereafter diethyl ether was added to the alcohol solution until the hydrogen chloride salt of the azo body precipitated. The solid material which did not have a melting point was separated from the alcohol-ether mixture. This hydrogen chloride salt was added to distilled water in the ratio of one part to 3500 parts and *Bacillus coli* treated with the resulting solution. The examination showed that the bacillus was killed by the treatment.

Example VI

Meta-tri-fluoro-methyl-phenyl-azo-meta-toluylene-diamine (described in Example II) was dissolved in olive oil to produce a 10% solution. It was found that this material could be used internally and that it had valuable germicidal properties.

Example VII

Meta-tri-fluoro-methyl-phenyl-azo-2:4-diaminoanisole, prepared in the manner set out in Example III, was dissolved in palm oil to produce a 15% solution. This material was found to be an effective bactericide and to be suitable for internal use.

Example VIII

Rice was boiled with water to produce a paste. This paste had a consistency such that it remained a paste upon standing. There was incorporated in the same by grinding .2% of meta-tri-fluoro-methyl-phenyl-azo-meta-phenylene-diamine. This product was inoculated with a culture of *Fomes annosus*. This fungus failed to develop in this medium whereas in a similar medium which omitted the aforesaid azo compound it developed freely.

Example IX

Rice was boiled with water to produce a paste of such consistency that it remained a paste upon standing. There was incorporated in the same by grinding .2% of meta-tri-fluoro-methyl-phenyl-azo-meta-phenylene-diamine. This product was inoculated with *Aspergillus niger*. This fungus failed to develop in this medium whereas in a like medium which omitted the azo compound it developed freely.

Example X

Rice was boiled with water to produce a paste having a consistency such that it remained a paste upon standing. The paste was divided into two parts and in one there was incorporated by grinding .2% of meta-tri-fluoro-methyl-phenyl-azo-meta-phenylene-diamine. Both parts were inoculated with *Ceratostomella tilifera*. This fungus failed to develop in the medium containing the azo compound whereas in the other medium it developed freely.

Example XI

Rice was boiled with water to produce a paste having a consistency such that it remained a paste upon standing. There was incorporated in some of this paste by grinding .2% of meta-tri-fluoro-methyl-phenyl-azo-meta-phenylene-diamine. This product was innoculated with a culture of *Rhizopus nigricans*. This fungus failed to develop in this medium. In the untreated paste it developed freely.

Example XII

A culture of *Streptococcus aureus* when treated with a water solution of meta-tri-fluoro-methyl-phenyl-azo-meta-phenylene-diamine hydrochloride in a concentration of 1 to 10,000 was killed in thirty minutes treatment.

Example XIII

Meta-tri-fluoro-methyl-phenyl-azo-meta-phenylene-diamine hydrochloride was dissolved in water to a strength of 1 to 15,000 and a culture of *Pneumococcus* was treated with this colution. The organism was killed at once.

Example XIV

A water solution containing one part of meta-tri-fluoro-methyl-phenyl-azo-meta-phenylene-diamine hydrochloride in 15,000 parts of water killed a culture of *Streptococcus scarlatinæ* at once.

Example XV

A solution containing one part of meta-tri-fluoro-methyl-phenyl-azo-meta-phenylene-diamine hydrochloride in 10,000 parts of water killed typhoid Bacillus at once. A solution containing one part of the same azo compound in 15,000 parts of water killed this microorganism in fifteen minutes.

*Example XVI*

Ten (10) parts of meta-tri-fluoro-methyl-phenyl-azo-meta-phenylene-diamine were mixed with 15 parts of lactic acid and gently heated on a boiling water bath until the mixture formed a dark-red solution. The so prepared material containing the lactic acid salt of the azo compound and the slight excess of lactic acid, was found to be valuable as a disinfectant and fungicide. It was found that the solution could be diluted with water or organic solvents for example, alcohol, acetone and the like, to any convenient strength. The diluted material was also found to be valuable as a disinfectant and fungicide. When one part of the original lactic acid solution was diluted with 2,000 parts of water it destroyed Staphylococcus aureus in five minutes.

*Example XVII*

It has been found that ethyl alcohol solutions of meta-tri-fluoro-methyl-phenyl-azo-meta-phenylene-diamine in concentrations of one part in 500 of the suspension medium, are valuable for local sterilization before surgery.

*Example XVIII*

It has been found that acetone solutions of meta-tri-fluoro-methyl-phenyl-azo-meta-phenylene-diamine in concentrations of one part in 500 of the suspension medium, are valuable for local sterilization before surgery.

*Example XIX*

Cellulose fabric which, under ordinary circumstances, would be subject to deterioration because of mildew and mold, was dyed with meta-tri-fluoro-methyl-phenyl-azo-meta-phenylene-diamine. These organisms failed to develop thereon.

*Example XX*

The prevention of the deterioration or destruction of leather (both as raw hides and as partly processed leather) by fungi and bacteria has long been a problem. Great losses are annually incurred in the storage of hides from these sources. Samples of leather treated with meta-tri-fluoro-methyl-phenyl-azo-meta-phenylene-diamine were inoculated with the fungi and bacteria which have been found responsible for the deterioration of leather and the so inoculated material stored in sterile containers. It was found that these organisms failed to develop on the treated material whereas untreated control samples similarly stored were freely attacked.

As will be apparent from the above examples either the free bases or their acid salts are valuable disinfectants and fungicides. These bodies may be conveniently used as their solutions in any desired concentration, as above explained. The solutions in organic solvents are of especial interest. If desired, these substances (free base, salt and solutions of the same) may be prepared in powder, paste, salve, ointment, emulsion or other convenient form, for medical or other purposes.

It is not intended to convey the impression that only the acid salts, set out in the above examples, are valuable or can be prepared. The acid salts of sulfuric acid, phosphoric acid, hydrobromic acid and acetic acid, are particularly readily prepared and give water solutions which may be used effectively.

As many apparently widely different embodiments of this invention may be made without departing from the spirit and scope thereof, it is to be understood that I do not limit myself to the specific embodiments thereof except as defined in the appended claims.

I claim:

1. A micro-organism devitalizing composition of matter containing as the active ingredient thereof a compound from the class consisting of a meta-trifluoromethyl-phenyl-azo-meta-phenylenediamine and the acid addition salts thereof.

2. A micro-organism devitalizing composition of matter containing as the active ingredient thereof a compound from the class consisting of compounds of the general formula:

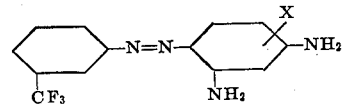

and the acid addition salts thereof, wherein X is a member of the group consisting of hydrogen, alkyl and alkoxy.

3. A micro-organism devitalizing composition of matter comprising olive oil containing as the active ingredient thereof the azo compound having the formula:

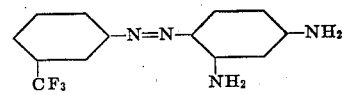

4. A micro-organism devitalizing composition of matter comprising an aqueous solution containing as the active ingredient thereof an acid addition salt of a meta-trifluoro-methyl-phenyl-azo-meta-phenylenediamine.

5. A micro-organism devitalizing composition of matter comprising an aqueous solution containing as the active ingredient thereof the hydrochloride of the azo compound having the formula:

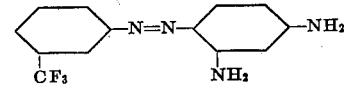

6. A micro-organism devitalizing composition of matter comprising an aqueous solution containing as the active ingredient thereof the lactate of the azo compound having the formula:

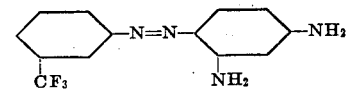

and free lactic acid.

7. A micro-organism devitalizing composition of matter containing as the active ingredient thereof a compound taken from the class consisting of trifluoromethyl-phenyl-azo-phenylene diamines and the acid addition salts thereof.

8. A micro-organism devitalizing composition of matter comprising a solution containing as the active ingredient thereof a compound taken from the class consisting of trifluoro-methyl-phenyl-azo-phenylene diamines and the acid addition salts thereof.

MAX ENGELMANN.